United States Patent [19]

Courtney et al.

[11] Patent Number: 4,946,553
[45] Date of Patent: Aug. 7, 1990

[54] APPARATUS FOR INTERFACING AN OPTICAL FIBER TO AN OPTICAL SOURCE

[75] Inventors: Daniel P. Courtney, Wilbraham; Timothy J. Bailey, Longmeadow, both of Mass.

[73] Assignee: United Technologies Corporation, Hartford, Conn.

[21] Appl. No.: 241,739

[22] Filed: Sep. 8, 1988

[51] Int. Cl.$^5$ .............................................. B32B 31/04
[52] U.S. Cl. ............................. 156/304.1; 156/304.2; 156/391; 156/538; 350/96.1; 350/96.2
[58] Field of Search .................... 156/158, 296, 304.1, 156/304.2, 391, 538; 350/96.1, 96.11, 96.2

[56] References Cited

U.S. PATENT DOCUMENTS

| | | | |
|---|---|---|---|
| 4,030,811 | 6/1977 | Khoe et al. | 350/96.1 |
| 4,237,474 | 12/1980 | Ladany | 350/96.2 |
| 4,500,165 | 2/1985 | Scholl et al. | 350/96.2 |
| 4,701,013 | 10/1987 | Jurczyszyn et al. | 350/96.2 |
| 4,702,547 | 10/1987 | Enochs | 350/96.2 |
| 4,729,623 | 3/1988 | Mery | 350/96.2 |
| 4,741,589 | 5/1988 | Halder et al. | 360/96.1 |
| 4,798,439 | 1/1989 | Preston | 350/96.2 |
| 4,812,002 | 3/1989 | Kato et al. | 350/96.2 |
| 4,834,491 | 5/1989 | Aoki et al. | 350/96.1 |

Primary Examiner—Caleb Weston
Attorney, Agent, or Firm—Charles E. Sohl

[57] ABSTRACT

An optical light source is interfaced to an optical fiber by mounting the optical light source on a source carrier, mounting the optical fiber on a fiber carrier, aligning the optical fiber with the optical light source and bonding the source carrier to the fiber carrier thereby securing the alignment of the optical fiber and the optical light source. The fiber carrier can be made to have the same or substantially the same thermal expansion characteristics of those of said source carrier. A lens may be interposed between the light source and the fiber, typically by forming a convex surface on the tip of the fiber. The apparatus so made thus comprises an optical fiber carrier, an optical fiber attached to the fiber carrier, a source carrier and an optical light source mounted on the source carrier aligned with the optical fiber. A lens may be provided between the source and the fiber, typically formed on the tip of the fiber. For both method and apparatus, separate source and fiber carriers may be dispensed with and a single carrier used for both source and fiber.

17 Claims, 1 Drawing Sheet

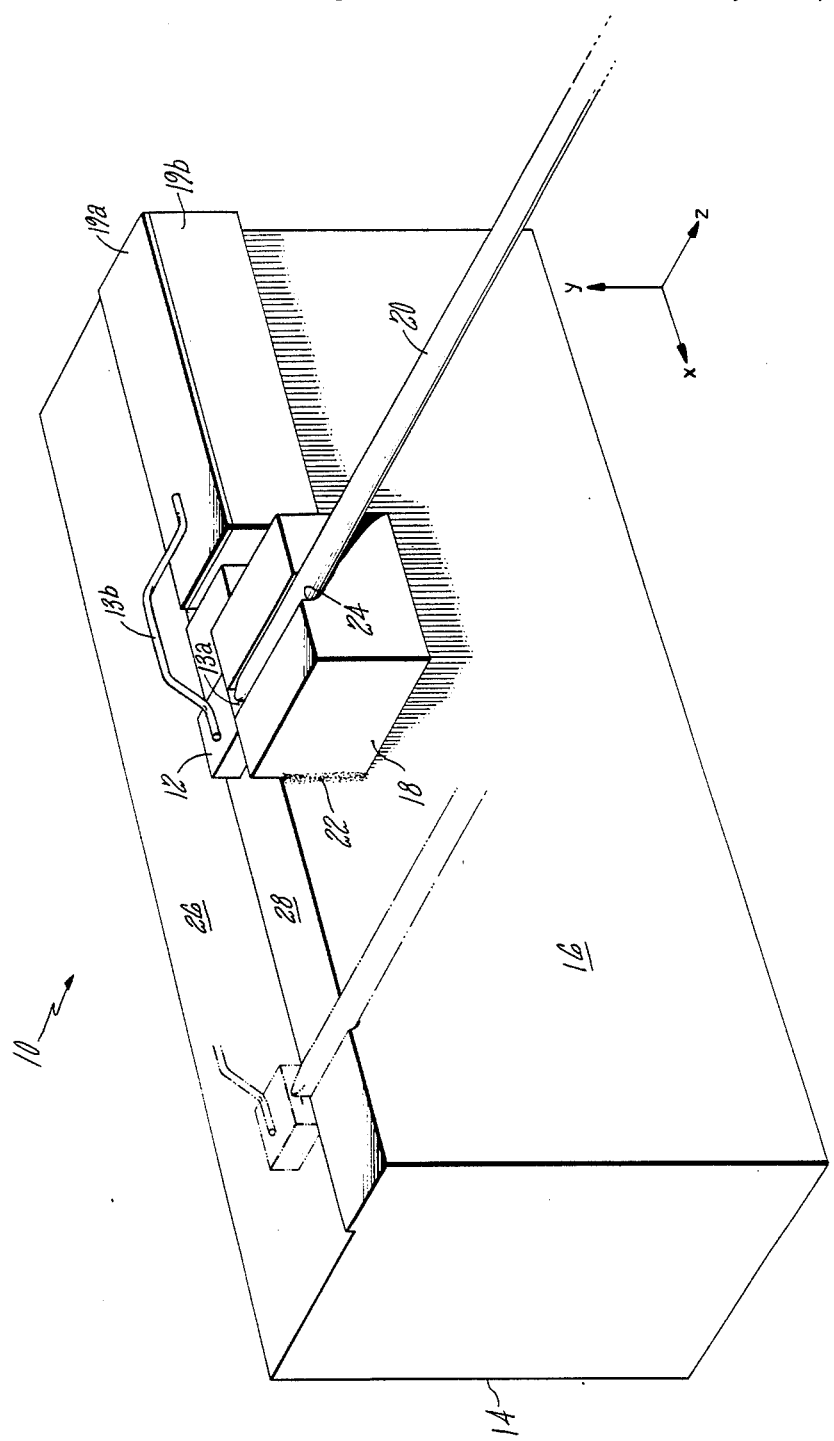

APPARATUS FOR INTERFACING AN OPTICAL FIBER TO AN OPTICAL SOURCE

TECHNICAL FIELD

This invention relates to a method for interfacing an optical fiber to an optical source such as a laser diode or a super luminescent diode and further relates to an apparatus made according to the claimed method.

BACKGROUND ART

Interfacing an optical fiber to an optical source is referred to as pigtailing. In the past, optical designers have not successfully solved the problem of providing a simple, lightweight, economical interface between an optical source and an optical fiber. Of the methods used in the past, they have been successful in the laboratory and in relatively benign environments only.

Those working in the art have been unable to demonstrate a rugged, shock-hardened pigtail device for an optical source.

A substantial need for a method of interfacing optical fibers to optical sources has developed in the fields of fiber optic sensors and communications systems. A typical application for such a device which is shock-hardened and capable of operation in wide temperature ranges is a fiber optic gyro for smart munitions and/or missiles used by the military. Commercial applications also exist whereby a solid, simple interface is desired.

It is known in the prior art to use grooves in a substrate to join optical fibers together. The grooves are used to align and secure the optical fibers. See an article, "Fiber Connectors, Splicers and Couplers" by Kao and Bickel, ITT Electro-Optical Products Divisions, Roanoke, Va. The use of tapered optical fiber in making connections to lithium niobate ($LiNO_3$) is known as taught by U.S. Pat. No. 4,445,571 (Divens et al.). This, however, is in the art of coupling lithium niobate substrate waveguide devices to optical cables, and is not for interfacing to an optical source such as a laser.

Optical fibers coupled to integrated optical (I/O) devices made of lithium niobate are well known in the art. Generally, these devices are large, complex and are sensitive to shock and vibration forces and are similar to known devices for pigtailing to an optical source. An I/O device coupled to an optical fiber in a superior manner is disclosed in U.S. Pat. No. 4,750,800 assigned to the same assignee as this application. That patent discloses the use of a fiber optic carrier in combination with the I/O device and the optical fiber. The fiber carrier is made of a material which has a coefficient of thermal expansion in the plane of the substrate mounting surface which is substantially equal to the coefficient and expansion of the I/O chip. In that patent it is also disclosed that the fiber carrier may be of the same material as the I/O chip. The I/O device and the fiber optic carrier are attached by the use of epoxy resin.

Prior art devices known to Applicants for interfacing an optical fiber to an optical source generally include large complex clamping devices which are mounted on a base along with the light source. See, for example, the advertisement on page 32 of the August 1986 issue of Fiber Optic Product News for a high reliability laser diode made by Stantel Components, Inc. For further examples, see part specification QLM1550FM for a Diode Laser Module made by LASERTRON of Boston, Mass., USA and part specification FU-43SLD-2 for a Laser Diode Module made by Mitsubishi of Japan.

DISCLOSURE OF INVENTION

In a copending application U.S. Ser. No. (Atty. Docket No. H1854-GC) and assigned to the same assignee as this application, a metallic bond between the fiber optic carrier and an I/O device or a substrate are disclosed. In another copending application, U.S. Ser. No. 103,325, a fiber carrier provides an effective coupling means between a cleaved facing surface of an optical fiber and a light port in an integrated optical device.

The invention disclosed herein uses an optical fiber carrier to interface an optical fiber to an optical light source. The carrier may be constructed of a material which has a coefficient of expansion which is the same as a base or substrate upon which the optical light source may be mounted. Or, if a base or substrate is not used, the source may be mounted onto the fiber carrier. The fiber carrier may include a slot, a V-groove or a rounded groove which is used to secure the fiber in place. The fiber may be tapered at the end adjacent to the optical light source, and may include a lens, for example a convex surface formed on the tip for gathering light rays from the source.

During assembly, the fiber carrier, to which a optical fiber has been attached, is placed adjacent to a surface of the base or substrate upon which the light source is mounted. In order to achieve maximum light conduction through the pigtailed connection, the intensity of the light passing through the optical fiber on the carrier may be measured, and the carrier's position may be adjusted for maximum light output. When this adjustment is complete, the fiber optic carrier is secured to the base or substrate supporting the light source.

The fiber optic carrier may be epoxied to the base or otherwise secured. For example, the base and fiber optic carrier may be made of a metal which will permit assembly by securely welding the two together. Still further, the optical fiber may be metallized and then welded to the metallic fiber optic carrier.

In another embodiment, the base or substrate and the fiber optic carrier may be made of materials other than metals, and then metallized to permit assembly by welding techniques such as laser welding, electrostatic welding and fusion bonding.

Assembly may also be by use of an adhesive such as an epoxy resin which will secure the fiber optic carrier to the base after proper alignment with the source.

This invention provides a simple shock-resistant and temperature-change-resistant method and apparatus for interfacing between an optical fiber and an optical light source such as a laser.

This invention teaches superior shock-resistance by providing strong bonds, e.g., a metallic bond between a fiber optic carrier and a source of optical light or a carrier therefor.

This invention provides a convenient and inexpensively reliable method and means for interfacing superluminescent and laser diodes to optical fibers.

This invention also teaches, for a "lensed" optical fiber, a simple method and means of positioning of the lens at the correct focal length thereof from the source's light aperture along an axis passing through the aperture by means of a groove in a fiber optic carrier which can be aligned with the axis of the optical light source so that the fiber can be moved in the groove to the correct position and then fixed in place. Other objects of this invention are to provide a simple heat sink for the source and to provide a means for carrying electrical energy to an optical light source.

It will be realized that the present invention was arrived at in the context of laser diode suppliers, such as described in the Background Art section, typically providing their customers with the laser diode source already attached to a heat sink, some with elaborate and expensive fixtures for holding the fiber in alignment. In such cases, the fixture can be eliminated entirely and the simple and effective approach taught herein used instead.

By this invention, an inexpensive and solid method is provided for interfacing a fiber to a source. This method lends itself to commercial mass production applications and also to economical construction of fiber optic components for military applications such as laser gyros in which a lack of susceptibility to shock and vibration is a requirement. The teachings herein allow one to make an effective and inexpensive interface. The disclosed teachings allow one to avoid prior art techniques of fixturing the fiber in place which is expensive while still shock susceptible Conventional tapered and lensed fibers may now be used with great ease and reliability at little expense. Welding or epoxy bonding of the fiber carrier and the source carrier will allow for easier assembly of the components.

The use of the same or substantially similar material for the source carrier and the fiber optic carrier ensures that relative movement between their interfacing surfaces is minimized over the temperature range of the environment. For embodiments in which a source carrier is used, use of a relatively small fiber carrier yields a low mass design which results in reduction of loading forces from high shock and high g environments.

These and other objects, features and advantages of the present invention will become more apparent in light of the following detailed description of a best mode embodiment thereof, as illustrated in the accompanying drawing.

BRIEF DESCRIPTION OF THE DRAWING

The sole FIGURE shows an assembled fiber carrier and source carrier in accordance with this invention.

BEST MODE FOR CARRYING OUT THE INVENTION

Referring first to the FIGURE there is shown a pigtailed optical light source apparatus 10 in accordance with this invention. An optical source 12 has a light aperture 13a for providing light. It has an energizing electrode 13b attached thereto and is mounted on a source carrier 14. Source carrier 14 provides a stable mounting base and a surface 16 which may be used to align and mount a fiber optic carrier 18. In order to energize the source 12, the electrode 13b may also be connected to a top surface or layer 19a (which may be a metallized top surface or layer having sufficient thickness to carry current necessary to sustain the source) of a block 19b which may be a dielectric. An electrical source (not shown) may then also be connected to the surface or layer 19a. The surface 19a on block 19b is of course merely a convenient means of providing for electrical connection and forms no part of the presently claimed invention. In the setup shown, the return electrical path is through the source carrier 14 which will in that case be metal.

An optical fiber 20 is secured to the fiber optic carrier 18 by means, e.g., of an adhesive, or, for another example, by means of a metallic bond such as welding or soldering if a compatible metal is present at least at the surface of the fiber optic carrier and the fiber itself is metallized. The optical fiber may be be tapered and then "lensed" to provide an optical connection to the source. E.g., if tapered, the tip end may comprise a flat planar surface which may be butted against the light source's aperture 13a or may include a small convex lens formed at the tip of the taper in order to more efficiently gather light from the aperture 13a.

During assembly of the apparatus 10, movement is permitted between the fiber optic carrier 18 and the source carrier 14. During such movement the source is energized, and a measurement of the light intensity emanating from optical fiber 20 may be made for various positions. When a maximum measurement is observed at a particular position, the fiber optic carrier 18 is then bonded at that position to the source carrier 14.

Alignment between the source 12 and the optical fiber 20 may also be achieved by other methods such as by accurate mechanical placement of the optical source 12 on the source carrier 14 and alignment of the fiber optic carrier 18 with the source carrier 14. This may be accomplished, among other conceivable approaches, by accurately machined stops or dowels on the source carrier, or by use of a fixture during assembly. But such purely mechanical methods are not presently preferred due to the extreme problems of accuracy which would have to be overcome by such means of alignment.

Bonding of the source 12 and the fiber optic carrier 18 may be by any number of means such as the use of adhesives including epoxy, or by means of welding the parts together if they are made of metal or if they are parts whose surfaces have been metallized. Such welding may be by means of laser welding, electrostatic welding, diffusion welding or any other known welding technique which can be used to join the metallic surfaces together. Soldering with a different metal may also be used.

The source carrier 14 is preferably made of a metal or a material which will provide a heat sink, preferably sufficiently massive to conduct away the heat generated by the source 12 for dissipation. If metal is used, a metal should also be used for the fiber optic carrier for matching thermal expansion coefficients. In such a case, it will be convenient to form a welded connection between the carrier 14 and the carrier 18 as indicated at reference 22 although other bonds such as epoxy may be used. It will be understood that such a weldment 22 may of course extend along the other edges (not shown) of the fiber carrier-source carrier interface where the edges of the carrier make contact with the surface 16. Such is not explicitly pictured all the way around in the FIGURE due to the inherent limitations of the drawing.

The disclosed method provides a rugged, shock-hardened, pigtailed device which may withstand shock levels in the order of 20,000 g's. An assembly made according to the method provides a suitable means for interfacing a small source and small fiber which provides a strong mechanical interface between the two.

The source 12 may be any suitable light source such as a laser diode, or superluminescent diode.

As previously described, the source carrier can be made of metal and can be fitted with a dielectric block 19b to provide for an electrical connection 19a to the source of electrical power. In addition to serving as a return path for the electrical current it serves as a thermal path for dissipating heat generated by source 12. Ideally, but not necessarily, the source carrier should thus have high electrical and thermal conductivity and low thermal expansion. It is contemplated that the fiber carrier will be made of the same substantially similar material as that of the source carrier in order to reduce thermal mechanical stresses developed between the carriers.

The fiber carrier 18 may also include a groove or slot 24 which may be used for longitudinally aligning the fiber optic conductor with respect to the aperture of the optical source.

During assembly, the optical fiber carrier 18 may be aligned in all three spatial axes with respect to the axes of the optical light source carrier. Several techniques for this alignment are possible.

In one technique, one spatially aligns the fiber to the source and holds it fixedly in place with respect to the source by means, e.g., of a temporary fixture, before the fiber carrier is brought in. Once optical alignment of the fiber with the source is achieved, permanent attachment may be made between the fiber carrier and the source carrier and between the fiber and the fiber carrier by suitable joining techniques such as welding or use of adhesive epoxies.

Another method utilizes the fiber carrier with an alignment channel for the fiber along a Z-axis of the carrier. The fiber may be positioned in the channel and longitudinally aligned along the Z-axis of the carrier. The channel may be V-shaped, of semi-circular shape, or any other convenient shape which will allow the round conductor to make sufficient contact with the channeled surface of the fiber optic carrier. The Z-axis is maintained perpendicular to the an XY plane which is the plane of the end face of the fiber optical carrier as generally indicated by the XYZ coordinate system shown in the FIGURE. The designation of the XYZ coordinates of the FIGURE is merely a matter of convenience and any other coordinate system or designation may be used. The plane of the end face of the carrier is brought up into contact with surface 16 of the source carrier and X-Y alignments are then performed by sensing the X-Y position at which the light output from the fiber is maximized. The fiber carrier is bonded to the source carrier in this position.

In a first, alternate but not preferred embodiment, the source carrier, pictured as relatively large in the FIGURE with respect to the fiber carrier, may instead be used as the fiber carrier and a relatively small carrier be used to mount the source. In a second, alternate but not preferred embodiment, the fiber carrier 18 could be eliminated, and the carrier 14 (or a downsized version thereof) used as both a source and fiber carrier. This case is illustrated in phantom in the FIGURE and differs from the preferred embodiment illustrated in solid lines in the FIGURE, where the fiber carrier is separate from the source carrier. Referring to the FIGURE, the source 12 placed down a step on a shelf 26 and a surface 28 used for the fiber 20 with or without a groove. Here the dual purpose carrier can be provided in sufficient mass and size to provide a heat sink for the source or can be made small in size (e.g., comparable to the relative size of carrier 18) and serve mainly as a heat conduit rather than a sink.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. Apparatus for interfacing and aligning an optical fiber to an optical source, comprising:
   a source carrier;
   said source carrier having a surface in a XY plane and a surface in a YZ plane;
   an optical light source,
   said optical light source having an aperture for providing light;
   said optical light source attached to said source carrier and aligned with
   an optical fiber attached to said source carrier,
   a fiber carrier,
   said fiber carrier having a surface in a XY plane and a surface in a XZ plane;
   said source carrier being interfaced and bonded to a common XY plane of said fiber carrier
   whereby said optical fiber length is supported in the region adjacent to the fiber carrier source carrier interface, to provide maximum stability in high gravitational environments.

2. The apparatus of claim 1 wherein said source carrier and said fiber carrier are made of materials which have substantially the same coefficients of thermal expansion.

3. The apparatus of claim 1 wherein said source carrier and said fiber carrier are the same material.

4. The apparatus of claim 1 wherein said source carrier and said fiber carrier are metallic.

5. The apparatus of claim 1 wherein said optical light source carrier and said fiber optic carrier are spatially aligned in at least one axis of thermal expansion.

6. The apparatus of claim 1 wherein said optical fiber is mounted on said XZ surface of said fiber carrier, said fiber carrier is perpendicular to said XY plane of said source carrier, said source carrier is interfaced to said XY plane of said fiber carrier.

7. The apparatus of claim 1 wherein said fiber is tapered at the end which faces said optical light source.

8. The apparatus of claim 1 wherein said fiber has a lens formed on its end which faces said optical light source.

9. The apparatus of claim 1 wherein said fiber carrier has a longitudinal mounting surface on said XZ plane for said optical fiber.

10. The apparatus of claim 9 wherein said longitudinal mounting surface is a groove in said XZ plane in said fiber carrier.

11. The apparatus of claim 9 wherein said longitudinal mounting surface is the inside surface of a hole through said fiber carrier.

12. The apparatus of claim 1 wherein said source carrier functions as an electrical conductor and as a thermal path for heat generated by said optical source.

13. The apparatus of claim 1 wherein said source and fiber carriers are made of metal and where said source and fiber carriers are joined together by welding.

14. The apparatus of claim 1 further comprising:
    a metal deposited on said optical fiber; and
    a metallic bond between said optical fiber and said fiber carrier.

15. The apparatus of claim 1 wherein said optical fiber has a plane end face and is butt coupled to the aperture of said optical light source.

16. An apparatus according to claim 1 wherein said fiber carrier supports said optical fiber, over essentially its entire length in the region of the source carrier fiber carrier interface, to provide maximum stability in high gravitational environments.

17. A method of interfacing an optical light source to an optical fiber comprising the steps of:
mounting the optical light source on a source carrier;
aligning the optical fiber with the optical light source;
bonding the optical fiber on a fiber carrier, said fiber carrier having substantially the same thermal expansion characteristics as those of said source carrier; and
bonding said source carrier to a common XY plane of said fiber carrier thereby securing said alignment of the optical fiber to said optical light source,
whereby said optical fiber length is supported along the entire region at the fiber carrier source carrier interface, to provide maximum stability in high gravitational environments.

* * * * *